(12) United States Patent
Sabato et al.

(10) Patent No.: US 12,730,035 B2
(45) Date of Patent: Sep. 8, 2026

(54) METHOD AND SYSTEM FOR MONITORING A STATUS OF A TYRE

(71) Applicant: Pirelli Tyre S.p.A., Milan (IT)

(72) Inventors: Diego Sabato, Milan (IT); Niccolò Castelllani, Milan (IT); Gabriele Montorio, Milan (IT); Armando Longobardi, Milan (IT)

(73) Assignee: IRELLI TYRE S.p.A., Milan (IT)

( * ) Notice: Subject to any disclaimer, the term of this patent is extended or adjusted under 35 U.S.C. 154(b) by 510 days.

(21) Appl. No.: 18/257,985

(22) PCT Filed: Dec. 22, 2021

(86) PCT No.: PCT/IT2021/050422

§ 371 (c)(1), (2) Date: Jun. 16, 2023

(87) PCT Pub. No.: WO2022/144940

PCT Pub. Date: Jul. 7, 2022

(65) Prior Publication Data

US 2024/0053228 A1 Feb. 15, 2024

(30) Foreign Application Priority Data

Dec. 30, 2020 (IT) ........................ 102020000032807

(51) Int. Cl.
*G01M 17/02* (2006.01)
*B60C 11/24* (2006.01)
*B60C 23/04* (2006.01)

(52) U.S. Cl.
CPC ........... *G01M 17/02* (2013.01); *B60C 11/246* (2013.01); *B60C 23/0488* (2013.01)

(58) Field of Classification Search
CPC . B60C 11/246; B60C 23/0488; B60C 23/064; G01M 17/02; G01M 7/00
See application file for complete search history.

(56) References Cited

U.S. PATENT DOCUMENTS 6,278,361 B1 8/2001 Magiawala et al.
9,259,976 B2 2/2016 Singh et al.
(Continued)

FOREIGN PATENT DOCUMENTS

EP 1106397 A2 6/2001
EP 1 878 596 A2 1/2008
(Continued)

OTHER PUBLICATIONS

International Search Report form the European Patent Office in corresponding International Application No. PCT/IT2021/050422 mailed Apr. 4, 2022.
(Continued)

*Primary Examiner* — Kristina M Deherrera
*Assistant Examiner* — Gedeon M Kidanu
(74) *Attorney, Agent, or Firm* — Finnegan, Henderson, Farabow, Garrett & Dunner, L.L.P.

(57) ABSTRACT

Method (200), and related system (100), for monitoring a status of a tyre (99) fitted on a vehicle, the method comprising: —with the vehicle in motion and the tyre (99) in rotation, acquiring (3, 6) a motion signal representative of a motion of a crown portion (31) of the tyre (99), wherein the motion signal temporally corresponds to a plurality of turns of the tyre (99); —filtering (15, 42) from the motion signal a part of the motion signal temporally corresponding at least to each passage of the crown portion (31) in a footprint area of the tyre (99), for obtaining a filtered motion signal; —obtaining (4, 7) a frequency spectrum of the filtered motion signal; —determining (11) the status of the tyre (99) based on the frequency spectrum.

12 Claims, 4 Drawing Sheets

(56) References Cited

U.S. PATENT DOCUMENTS

| | | | | |
|---|---|---|---|---|
| 11,506,682 | B2 * | 11/2022 | Honda | G01P 3/44 |
| 2007/0174002 | A1 | 7/2007 | Kitazaki et al. | |
| 2007/0213953 | A1 * | 9/2007 | Kitazaki | G01B 21/32 73/146 |
| 2008/0015763 | A1 * | 1/2008 | Kitazaki | B60C 23/064 73/146 |
| 2010/0199756 | A1 | 8/2010 | Hanatsuka | |
| 2014/0366618 | A1 | 12/2014 | Singh et al. | |
| 2015/0040656 | A1 | 2/2015 | Singh et al. | |
| 2015/0090023 | A1 | 4/2015 | Masago | |
| 2018/0154707 | A1 | 6/2018 | Singh et al. | |
| 2024/0053228 | A1 | 2/2024 | Sabato et al. | |

FOREIGN PATENT DOCUMENTS

| | | | |
|---|---|---|---|
| EP | 2172760 | A1 | 4/2010 |
| EP | 2 813 378 | A1 | 12/2014 |
| EP | 2 837 510 | A1 | 2/2015 |
| EP | 3 210 799 | A1 | 8/2017 |
| EP | 3 330 106 | A1 | 6/2018 |
| JP | 2014102554 | A * | 6/2014 |
| WO | 2022144703 | A1 | 7/2022 |
| WO | 2022144939 | A1 | 7/2022 |
| WO | 2022144940 | A1 | 7/2022 |

OTHER PUBLICATIONS

Written Opinion of the International Searching Authority from the European Patent Office in corresponding International Application No. PCT/IT2021/050422 mailed Apr. 4, 2022.

International Search Report form the European Patent Office in corresponding International Application No. PCT/IT2021/050421 mailed May 2, 2022.

Written Opinion of the International Searching Authority from the European Patent Office in corresponding International Application No. PCT/IT2021/050421 mailed May 2, 2022.

International Search Report from the European Patent Office in corresponding International Application No. PCT/IB2021/062184 mailed Apr. 5, 2022.

Written Opinion of the International Searching Authority from the European Patent Office in corresponding International Application No. PCT/IB2021/062184 mailed Apr. 5, 2022.

Office Action issued by the European Patent Office on Aug. 19, 2024, in corresponding European Application No. 21 851 861.1, 4 pages.

* cited by examiner 501
502

METHOD AND SYSTEM FOR MONITORING A STATUS OF A TYRE

This application is a national stage entry application under 35 U.S.C. § 371 of International Application No. PCT/IT2021/050422, filed on Dec. 22, 2021, and claims priority to Italian Application No. 102020000032807, filed Dec. 30, 2020; the contents of each application is incorporated herein by reference in its entirety.

TECHNICAL FIELD OF THE INVENTION

The present invention relates to a method for monitoring a status of a tyre, for example a status of structural integrity or a status of tread wear, and a related system for monitoring a status of a tyre.

STATE OF THE ART

Typically, a tyre for vehicle has a substantially toroidal structure around a rotation axis thereof during operation, and it has an equatorial plane perpendicular to the rotation axis, said equatorial plane being typically a plane of (substantial) geometric symmetry (e.g., ignoring any minor asymmetries, such as the tread design and/or the writing on the sides and/or structure asymmetries or profile asymmetries).

With "inner cavity" it is meant the space delimited by the inner surface of the tyre and by the surface of the rim which faces towards the inner surface of the tyre, when fitted.

With "crown portion" it is meant the portion of tyre placed at the tread band.

The terms "radial" and "axial" are used with reference respectively to a direction substantially perpendicular to and to a direction substantially parallel to the rotation axis of the tyre.

The term "tangential" is used with reference to a direction substantially perpendicular to both the radial direction and the axial direction (e.g., generally oriented according to the rolling direction of the tyre).

The terms lateral, vertical and longitudinal refer respectively to the axial direction, the vertical direction and the horizontal direction.

With "footprint" it is meant the portion of outer surface of the tread band which, during the rolling of the tyre fitted and subjected to a load (for example due to the fitting on a vehicle), is in contact at every moment with the rolling surface. The footprint typically has a substantially null curvature (or substantially infinite curvature radius), or in any case it substantially assumes the conformation of the rolling surface.

With "footprint area" it is meant the part of the crown portion that is at the footprint at each moment.

Each of EP2813378, EP3330106, EP3210799 and EP2837510 discloses a system for estimating the status of wear of a tyre.

SUMMARY OF THE INVENTION

The Applicant has observed that the methods for estimating the wear of a tyre disclosed in EP2813378, EP3330106, EP3210799 and EP2837510 use a correlation model obtained through experimental measurements carried out prior to fitting the tyre on the vehicle and which allow, through identification of the coefficients of the model, to mathematically correlate the inflation pressure of the tyre, the frequency of the vibration mode of the tyre and the thickness of the tread band, the latter quantity being representative of the status of wear of the tyre. To identify these coefficients, cycles of tests are carried out on the tyre, which involve applying a plurality of different values of inflation pressure of the tyre for different predetermined thickness values of the tread band and identifying for each pair of values of pressure and of thickness of the tread band, the frequency of the vibration mode of the tyre from the frequency spectrum of a (accelerometric or speed) signal acquired under such controlled conditions of pressure and thickness of the tread band. During the use of the tyre, the coefficients thus determined are used to calculate the wear as a function of the measured pressure and of the measured frequency.

The Applicant has observed that EP2813378, EP3330106, EP3210799 and EP2837510 do not provide any details relating to the pre-processing of the accelerometric or speed signal on which the frequency spectrum is obtained.

The Applicant has verified that the analysis of the vibration modes of the tyre allows obtaining information on the status of the tyre itself, for example the status of wear of its tread.

According to the Applicant, when the vibration modes of the tyres are analysed, a frequency spectrum obtained from a (accelerometric or speed or displacement) signal not pre-processed, and therefore processed substantially as acquired, can include an information content representative of stresses and deformations correlated to the macro-deformations of the tyre which occur as an effect of the rolling. This information content, unrelated to the vibration modes of the tyre, can decrease the reliability and the accuracy of the evaluation of the vibration modes of the tyre, and consequently of the information relating to the status of the tyre.

The Applicant has therefore faced the problem of realizing a method and a system for monitoring that allow to reliably and precisely evaluate the status of a tyre.

According to the Applicant, this problem is solved by a method and a system for monitoring the status of a tyre which provide for the frequency processing of a motion signal representative of a motion of a crown portion of the tyre, in which the part of the signal corresponding at least to each passage of the crown portion in the footprint area of the tyre is previously filtered.

According to an aspect the invention relates to a method for monitoring a status of a tyre fitted on a vehicle, the method comprising:

- with said vehicle in motion and said tyre in rotation, acquiring a motion signal representative of a motion of a crown portion of said tyre, wherein said motion signal temporally corresponds to a plurality of turns of said tyre;
- filtering from said motion signal a part of the motion signal temporally corresponding (at least) to each passage of said crown portion in a footprint area of the tyre, for obtaining a filtered motion signal;
- obtaining a frequency spectrum of said filtered motion signal;
- determining said status of the tyre based on said frequency spectrum.

According to another aspect the invention relates to a system for monitoring a status of a tyre fitted on a vehicle, the system comprising:

- a motion sensor fixed at a crown portion of said tyre and configured for detecting a motion of said crown portion of the tyre;

at least one processing unit in communication with said motion sensor and programmed and configured for carrying out the above method of the present invention.

The Applicant has found that the part of the motion signal acquired when the relevant crown portion (i.e., the one on which the motion sensor is applied) passes in the footprint area, represents the part of the motion of the crown portion which, during rolling, is substantially constrained to the rolling surface (e.g., the road), and which causes the vibrations of the remaining crown portion which is free from the constraint with the ground. According to the Applicant, without limiting to any theory, when the crown portion on which the motion sensor is applied is in the footprint area, it is not free to vibrate according to the own vibration modes of the tyre. Therefore, the Applicant has realized that the frequency processing of the corresponding part of the motion signal would entail the introduction in the frequency spectrum of an information containing also contributions not related to the vibration modes of the tyre, for example contributions related to the macro-deformation undergone by the tyre in the footprint area during the rolling.

By the filtering (in the time domain) of the part of the motion signal corresponding (at least) to the footprint area, it is therefore possible to obtain a frequency spectrum wherein the frequency information substantially contains only the contributions related to the own vibration modes of the tyre, allowing to obtain an accurate and reliable spectral analysis and consequently a reliable and precise determination of the status of the tyre.

The Applicant, without limiting to any theory, has realized that the frequency spectrum obtained from the filtered motion signal is representative of the own vibration modes of the tyre, and in particular has realized that it is possible to distinguish in the frequency spectrum each vibration mode of the tyre or each combination of vibration modes of the tyre. Therefore, from the frequency spectrum, it is possible determining the status in which the tyre is, since a possible change in the status of the tyre results in a change in the frequency of at least one vibration mode (or of at least one combination of vibration modes) of the tyre, which in turn is reflected in a change in the frequency spectrum: this change can then be identified. A change in the status of the tyre could be related, for example, to the wear of the tread band and/or to a damage of the carcass and/or to a loss of integrity of the tyre, for example due to damage or breakage of the tyre.

The present invention in one or more of the aforesaid aspects can have one or more of the following preferred features.

Preferably said at least one processing unit is programmed and configured for carrying out any one of the embodiments of the method of the present invention.

In one embodiment, for each turn, the part of the motion signal that is filtered temporally corresponds to a portion of turn of the tyre which subtends an angle, with respect to a rotation axis of said tyre, greater than or equal to 100°, more preferably greater than or equal to 120°, and/or less than or equal to 220°, more preferably less than or equal to 200°. For example, this portion of turn in which the filtering occurs subtends an angle of 180° centered in the center of the footprint area. In this way, the method is more precise since it is filtered the whole part of the motion signal which could potentially contain an information contribution not directly related to the vibration modes of the tyre.

Preferably the filtering of said part of the motion signal comprises multiplying said motion signal by a reducing factor. Preferably said reducing factor is a window function, more preferably a Hanning window. In this way it is possible to weightily reduce the information content of the part of the motion signal corresponding to each passage of the crown portion in the footprint area of the tyre.

Preferably said window function has a bell shape centred in a centre of said footprint area. In other words, the window function assumes the minimum value (typically equal to zero) when the relevant crown portion is at the centre of the footprint area, to progressively grow moving away from the centre up to assume a maximum value (typically equal to one) at the edges of the chosen window (which can also coincide with a complete turn). In this way, it is possible to progressively reduce the value of the part of motion signal as a function of the position of the relevant crown portion with respect to the footprint area of the tyre.

In one embodiment, the filtering of said part of the motion signal comprises reducing said part of the motion signal to a null value or preferably eliminating said part of the motion signal. In this way the filtering and/or the subsequent frequency analysis require less computational resources. Preferably the acquisition of said motion signal is carried out provided that a lateral acceleration of the vehicle is less than or equal to 2 $m/s^2$, more preferably less than or equal to 1 $m/s^2$, even more preferably less than or equal to 0.5 $m/s^2$, (in absolute value). In other words, the motion signal is typically acquired during a (substantially) straight forwarding of the vehicle, for example the acquisition of the motion signal does not take place during turns.

Preferably the acquisition of said motion signal is carried out provided that a longitudinal acceleration of the vehicle is less than or equal to 2 $m/s^2$, more preferably less than or equal to 1 $m/s^2$, even more preferably less than or equal to 0.5 $m/s^2$, (in absolute value). In other words, the motion signal is acquired in conditions of (substantially) constant forward speed of the vehicle, for example the acquisition of the motion signal does not occur during the acceleration or braking phases of the vehicle.

The Applicant has experimentally verified that in one or both these conditions the reliability, the accuracy and/or the precision of the frequency analysis improves. This could be due to the fact that in one or both these conditions it is possible to limit possible disturbances on the motion signal linked to phenomena extrinsic to the vibration modes of the tyre, which introduce information contributions in the frequency spectrum not related to the vibration modes of the tyre.

Preferably the system comprises an acceleration sensor, more preferably mounted onto said vehicle, for detecting a longitudinal and/or lateral acceleration of the vehicle, the acceleration sensor being connected to said at least one processing unit. In this way it is possible to detect the longitudinal and/or lateral acceleration of the vehicle to drive the acquisition of the motion signal when the longitudinal acceleration and/or lateral acceleration are within the aforesaid ranges of values.

Preferably the acquisition of said motion signal is carried out provided that a forward speed of the vehicle is greater than or equal to 20 km/h, more preferably greater than or equal to 30 km/h, and/or less than or equal to 80 km/h, more preferably less than or equal to 70 km/h. The Applicant has verified that in this range of forward speed of the vehicle it is possible obtaining a good quality of the motion signal for the frequency processing.

Preferably the system comprises a speed sensor, more preferably mounted onto said vehicle, for detecting a forward speed of the vehicle, the speed sensor being connected to said at least one processing unit. In this way it is possible to detect the forward speed of the vehicle to drive the acquisition of the motion signal when the forward speed is within the aforesaid range of values. Preferably said plurality of turns of the tyre contains a total number of said turns greater than or equal to 300, more preferably greater than or equal to 400, even more preferably greater than or equal to 500, and preferably less than or equal to 2000, more preferably less than or equal to 1500, even more preferably less than or equal to 1000. The Applicant has experimentally verified that this range of values is a good compromise between high reliability and precision of the spectral analysis (dependent on the temporal length of the acquired signal) and the related request of memory capacity, processing capacity, acquisition time and/or energy consumption.

In one embodiment, said motion signal comprises a plurality of motion signal portions respectively temporally corresponding to a plurality of continuous time intervals.

Preferably each continuous time interval is temporally separated from the (temporally) subsequent continuous time interval. In other words, said motion signal is obtained by acquiring signal portions at time intervals spaced apart with respect to each other.

The Applicant has verified that in this way it is possible to obtain an improvement in the reliability and/or in the accuracy of the spectral analysis, and moreover it is possible making the method compatible with a normal use of a vehicle. The Applicant has in fact realized that the acquisition conditions of the motion signal during the use of the tyre significantly affect the quality (in terms of information content) of the obtained frequency spectrum and consequently also the subsequent estimate of the status of the tyre. In particular, the Applicant has realized that for improving the quality, the reliability and the precision of the method and for accurately identifying different status of the tyre (for example different levels of wear of the tyre) it is advantageous acquiring the signal varying the excitation conditions of the tyre, to completely excite it. The acquisition of a motion signal composed of different portions not temporally consecutive and therefore representative of temporally and spatially spaced apart conditions of the advancement of the vehicle makes reasonably possible the acquisition of signal portions representative of different excitation conditions of the tyre and its vibration modes, thus making the information content of the resulting frequency spectrum richer and more complete. Furthermore, this technique allows to obtain the signal, albeit in different acquisitions, on a (typically predetermined) sufficient total number of turns, respecting the acquisition conditions of the method, compatibly with a normal use of the vehicle (during which the conditions vary in an unpredictable way and regardless of the requirements of the present method).

In one alternative embodiment, said motion signal comprises one and only one motion signal portion temporally corresponding to a continuous time interval. In this way, where this is possible, the motion signal is acquired in a short time in order to speed up the passage to the processing of the obtained signal.

Typically, each motion signal portion temporally corresponds to at least one turn of said tyre, more preferably to a respective plurality of turns.

Preferably it is provided categorizing a forward speed of the vehicle into a plurality of speed sub-intervals, more preferably disjoint from each other (i.e., not even partially overlapped). Preferably said plurality comprises at least three speed sub-intervals and/or not more than twelve speed sub-intervals, more preferably not more than ten speed sub-intervals.

Preferably each speed sub-interval has a width greater than or equal to 4 km/h, more preferably greater than or equal to 6 km/h, and/or less than or equal to 20 km/h, more preferably less than or equal to 15 km/h. In this way the excitation conditions of the tyre in two different sub-intervals are significantly different from each other.

Preferably said motion signal comprises a plurality of groups of said motion signal portions. Preferably the groups of signal portions are substantially homogenous to each other in terms of tyre turns to which each group globally corresponds.

Preferably said motion signal portions of each group are acquired provided that the forward speed of the vehicle is included in a respective speed sub-interval. In this way it is possible to monitor the number of turns acquired in a specific and/or in each speed sub-interval, and therefore in specific excitation conditions of the tyre.

In one embodiment, at least one (preferably each) group of motion signal portions comprises one and only one continuous motion signal portion.

Preferably each group of signal portions temporally corresponds to a number of turns greater than or equal to 10, more preferably greater than or equal to 20, and less than or equal to 180, more preferably less than or equal to 150. In this way the groups of motion signal portions have a sufficient overall time length to be able to confer a significant information content to the frequency spectrum, while maintaining the group of motion signal portions limited in duration so as not to excessively burden the requests of memory capacity and processing capacity and/or energy consumption.

Preferably said determining said status of the tyre is carried out based on a time trend of said frequency spectrum, more preferably of a (preferably continuous) portion of the frequency spectrum in a frequency range from 20 Hz up to 200 Hz, more preferably up to 120 Hz. In this way it is possible to monitor a possible change of status of the tyre directly correlated to a change over time of the frequency spectrum, and in particular of the portion of frequency spectrum comprised between 20-200 Hz, which the Applicant believes to be the one with higher information content since at least some of the first vibration modes of the tyre are in this frequency range. Preferably said frequency spectrum comprises a plurality of peaks. The Applicant has realized that the plurality of peaks of the frequency spectrum is representative of vibration modes of the tyre, and in particular each peak is representative of a specific vibration mode of the tyre or of a specific combinations of vibration modes of the tyre. Preferably it is provided identifying a determined peak in said plurality of peaks and determining a frequency of the determined peak. Preferably said determining said status of the tyre is carried out based on said frequency of said determined peak, more preferably based on a temporal trend of said frequency of the determined peak. The Applicant has in fact realized that the determined peak is representative of a selected vibration mode (or of a same combination of vibration modes) of the tyre which advantageously can be easily identified within the frequency spectrum. By monitoring the frequency of the determined peak over time, it is therefore possible to obtain a simple, reliable and accurate determination of the status of the tyre.

Preferably said frequency of the determined peak is a modal frequency of a vibration mode (or a combination of vibration modes) of the tyre, more preferably selected in the following group of vibration modes: lateral translational, vertical translational, horizontal translational, torsional around the rotation axis of the tyre (Y), torsional around the vertical axis (Z) and torsional around the horizontal axis (X). The Applicant has in fact realized that the aforesaid first six vibration modes of the tyre are characterized by a respective modal frequency which is typically in a certain frequency range of the frequency spectrum. Therefore, from the frequency spectrum, the peaks representative of the first six vibration modes are easily identifiable, making it possible to evaluate possible changes in the status of the tyre from the monitoring over time of the frequency of these peaks, or, in other words, from the change over time of the frequency of such peaks.

Preferably said motion signal is an accelerometric signal (alternatively it is a speed signal or displacement/deformation signal) representative of at least one component of a, more preferably linear, acceleration (or of a velocity or of a displacement/deformation) undergone by said crown portion of said tyre, more preferably by a portion of inner surface of the tyre belonging to said crown portion of said tyre. In this way it is acquired a signal which allows giving an identifiable representation of the vibration modes (i.e., represented by the peaks) in the frequency spectrum by a sensor installed in a protected part of the tyre such as its inner cavity.

Preferably said at least one component of the acceleration is selected in the group: axial component, radial component and tangential component. In this way, the first vibration modes of the tyre are effectively detected.

Preferably said motion sensor is an accelerometric sensor (alternatively is a speed sensor or a displacement/deformation sensor) structured for detecting at least one component (up to three components) of a, more preferably linear, acceleration (or of a speed or of a displacement/deformation) undergone by said crown portion of said tyre, more preferably by a portion of inner surface of the tyre belonging to said crown portion of said tyre. Preferably said motion sensor is fixed at said portion of inner surface.

Preferably said identifying said determined peak comprises:

- in said frequency spectrum, ordering the peaks of said plurality of peaks, assigning a sequential (increasing) order n to an increasing value of the frequency of each peak in the frequency spectrum;
- in said frequency spectrum, identifying a peak of order n, said peak of order n being said determined peak.

In this way a peak representative of a vibration mode (or of a combination of vibration modes) of the tyre is simply selected.

In one embodiment in which said motion signal is representative of an axial (i.e., lateral) component of said motion, preferably said order n is equal to one.

Preferably said identifying said determined peak comprises, in said frequency spectrum, identifying a peak in a predetermined frequency range, more preferably going from 20 Hz (more preferably from 25 Hz, even more preferably from 30 Hz) up to 100 Hz (more preferably up to 80 Hz, even more preferably up to 60 Hz).

The Applicant has realized that when a motion (e.g., accelerometric) signal representative of the axial component of the motion (e.g., of the acceleration) is acquired and the frequency spectrum of the signal is obtained, the peak of order one in the frequency spectrum, which usually is located in the aforesaid frequency range (and therefore can be identified according to the order and/or according to the frequency position), represents the first lateral translational vibration mode of the tyre. The Applicant believes that this mode is particularly advantageous to be used for the determination of the status of the tyre since it is easily identifiable in the frequency spectrum since it is located in a portion of the frequency spectrum wherein the contribution of the other vibration modes of the tyre is substantially absent and therefore it is the only evident peak in this portion of the frequency spectrum. The Applicant has discovered that the lateral translational vibration mode is substantially free of interference from the other vibration modes of the tyre and/or it is not substantially influenced by factors extrinsic to the vibration phenomenon, but it is (substantially) only influenced by the status in which the tyre is when the motion signal is acquired. Consequently, a change in the frequency of the lateral translational vibration mode allows obtaining a direct and unambiguous indication of a corresponding change of the status in which the tyre is, thus making accurate and reliable the determination of the status of the tyre.

Preferably said determining said status of the tyre comprises determining a status of loss of structural integrity of said tyre provided that said frequency of the determined peak temporally decreases.

Preferably said determining said status of the tyre comprises determining a status of wear of (a tread band of) said tyre provided that said frequency of the determined peak temporally increases. The Applicant has in fact realized that, at least for the first six vibration modes of the tyre in which the belt layers are not subjected to deformation, the square of the modal frequency (f) is directly proportional to the modal stiffness (k) and inversely proportional to the modal mass, or moment of inertia, (m), with the three quantities that are linked by the mathematical formula $$f = \sqrt[2]{\frac{k}{m}}.$$

The Applicant has observed that for a tyre the modal stiffness and the modal mass can be considered mutually independent quantities, since the modal stiffness is substantially determined by the stiffness of the carcass while the modal mass is substantially determined by the mass of the elastomeric compounds (and in particular mainly by the mass of the tread band and in part of the sidewall), and that these quantities remain substantially constant or at most decrease during the operative life of the tyre (provided that the operating parameters of the tyre remain constant): for example, a significant increase in the stiffness of the carcass or an increase in the mass of the elastomeric compounds is typically not possible during use of the tyre. Therefore, in the event of wear of the tyre in which, for example, a reduction in the tread mass occurs, there will be a decrease in the modal mass of the tyre with respect to the modal mass of a not worn tyre, with a consequent increase in the modal frequency. Conversely, in the event of a loss of structural integrity in which the stiffness of the carcass decreases, a reduction in the modal stiffness of the tyre will occur with respect to the modal stiffness with the tyre substantially undamaged, with a consequent decrease in the modal frequency.

Preferably the determination of the status of wear of said tyre is carried out by:

- determining a reference modal mass of the tyre in a reference status;
- determining a reference modal stiffness of the tyre in said reference status;
- determining a thickness of a tread of said tyre as a function of said reference modal mass, said reference modal stiffness, said frequency of the determined peak and as a function of physical and geometric parameters of said tyre (e.g., geometric radius of the components of the tyre, tread width, etc).

Preferably said reference modal mass is greater than or equal to 60%, more preferably greater than or equal to 65%, and/or less than or equal to 85%, more preferably less than or equal to 82%, of a total mass of said tyre when new.

Preferably said reference status is a status of undamaged and not worn tyre (i.e., the tyre is substantially new, except for a limited mileage as explained below). In this way the reference status represents an acceptable status of the tyre.

Preferably it is provided determining said reference status provided that said vehicle has travelled a predetermined distance since when the tyre in a new status is fitted. For example, said distance is greater than or equal to 300 km, more preferably greater than or equal to 500 km, and more preferably less than or equal to 1000 km. In this way it is possible allowing the relaxation of the tyre, which releases the tensions accumulated during the production process (in particular during the vulcanization step), without however the tyre being significantly worn. Thus making, the initial transitory phase of the operative life of the tyre (e.g., within the firsts hundreds of kilometres) is eliminated, in which the tyre still has a configuration that does not reflect the one it will then assume for the remaining part of its operative life (unless of structural failure).

Preferably said determining said refence modal stiffness of the tyre is carried out as a function of said reference modal mass of the tyre and of said frequency of the determined peak determined with said tyre in a reference status. In this way it is possible to obtain the value of the reference modal stiffness which, according to the Applicant, is a value which typically remains substantially constant during the entire operative life of the tyre (given the same operating conditions of the tyre and the same integrity of the tyre), from when the tyre has assumed the reference status onwards.

Preferably said acquiring said motion signal is carried out at a respective current value of one or more operating parameters of said tyre and said method comprises detecting said respective current value of said one or more operating parameters.

Preferably said one or more operating parameters of said tyre are selected in the group: pressure, forward speed, temperature and vertical load.

In this way the operating parameters that could affect the stiffness of the carcass of the tyre, and thus the modal frequencies, are controlled.

Preferably the system comprises a pressure sensor, more preferably mounted onto said tyre, for detecting a pressure of the tyre, the pressure sensor being connected to said at least one processing unit.

In one embodiment the system comprises a temperature sensor for detecting an inner temperature of the tyre, the temperature sensor being connected to said at least one processing unit.

In this way, it is possible to accurately measure the value of the operating parameters of the tyre and to control a potential change over time in the operating parameters of the tyre, which could limit the reliability of the method.

Preferably said determining said status of the tyre based on said frequency spectrum is carried out as a function of said one or more operating parameters, more preferably as a function of at least said pressure.

Preferably said acquiring said motion signal, filtering said part of the motion signal, obtaining said frequency spectrum and determining said status of the tyre based on said frequency spectrum, more preferably based on said frequency of the determined peak, are carried out in a first operative phase of the vehicle with said tyre in said reference status, and, typically in an iterative way, in a second operative phase of the vehicle subsequent to said first operative phase. In this way it is possible to evaluate a change in the status of the tyre entirely with the tyre fitted on the vehicle and during normal use of the vehicle by comparing the frequency spectra (preferably the frequency of the determined peak) obtained in the first and second operative phases. The Applicant has in fact observed that the frequency spectrum obtained in the first operative phase is representative of the vibration modes of the tyre with the tyre in the reference status, which advantageously can coincide with the status of substantially new tyre, while the frequency spectrum obtained in the second operative phase is representative of the vibration modes of tyre with the tyre in a current status potentially different from the reference status. From this observation, the Applicant has realized that it is possible to determine the status of the tyre by comparing the frequency spectra obtained in the first and second operative phase and evaluating any change between the two frequency spectra, thus implementing the whole method for monitoring the status of the tyre with the tyre fitted on the vehicle (i.e., without pre-calibration) and limiting the possibility of overestimating or underestimating the status, for example of wear or of structural integrity, in which the tyre is.

Preferably determining said status of wear of said tyre comprises calculating a modal mass reduction of the tyre.

Preferably said modal mass reduction is calculated by a quadratic ratio between a reference frequency and said frequency of the determined peak of the frequency spectrum obtained in the second operative phase. Preferably said reference frequency is calculated as a function of said frequency of the determined peak of said frequency spectrum obtained in said first operative phase and at least one pressure value of said tyre respectively detected in said first and second operative phase. Alternatively, said modal mass reduction is calculated by the difference between said reference modal mass and a current modal mass of said tyre calculated as a function of said reference modal mass and of said respective frequencies of the determined peak. In this way, a qualitative or quantitative estimate of the wear degree undergone by the tyre is simply obtained. Preferably said calculating a thickness of the tread is carried out as a function of said current modal mass of the tyre and as a function of physical and geometric parameters of the tyre, for example the density of the compound, the width and the initial thickness of the tread band. In this way, the calculation of the thickness of the tread band is simplified for quantifying the wear degree undergone by the tyre.

DETAILED DESCRIPTION OF SOME EMBODIMENTS OF THE INVENTION

The features and advantages of the present invention will be further clarified by the following detailed description of some embodiments of the present invention, presented by way of non-limiting example, with reference to the attached figures.

Figure 1:
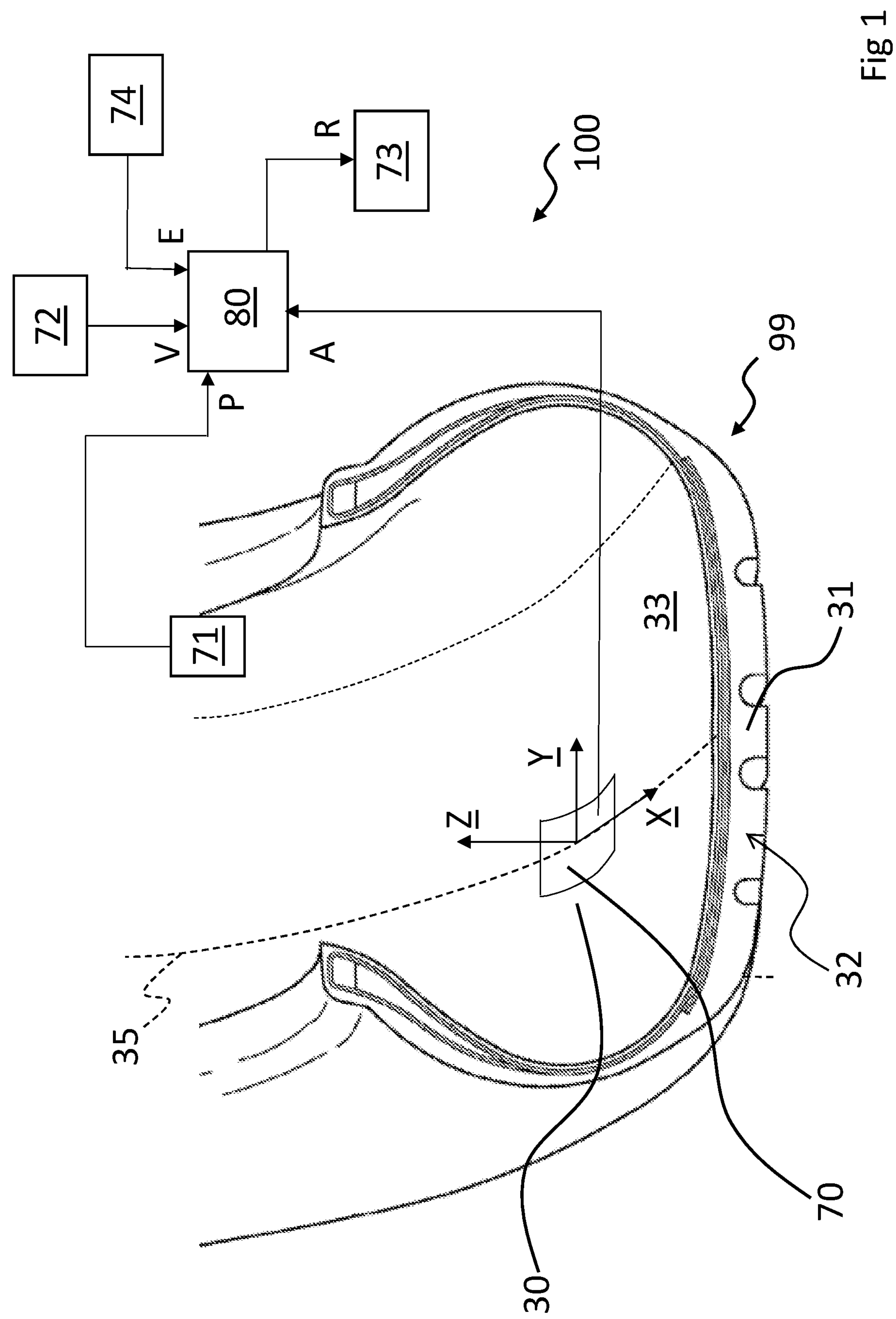
FIG. 1 shows a schematic, perspective and partial view of a section of tyre comprising a motion sensor belonging to the system for monitoring according to the present invention, schematized in the figure.

In FIG. 1 with the reference number 100 a system for monitoring a status of a tyre 99 according to the present invention is schematically shown. The system 100 comprises a motion sensor 70, exemplarily a triaxial accelerometric sensor, fixed to a portion 30 of the inner surface 33 of the tyre 99 belonging to a crown portion 31 of the tyre (i.e., the portion of tyre at the tread band 32). Preferably the accelerometric sensor 70 is mounted at a median plane of the tyre 99 (indicated by the dashed line 35). All figures are shown not to scale, for illustrative purposes only.

The accelerometric sensor 70 is advantageously placed so that its three axes are aligned respectively with the axes X (along the longitudinal direction), Y (along the axial direction) and Z (along the radial direction) and it is structured to separately detect a tangential component (directed along the X axis), an axial component (directed along the Y axis) and a radial component (directed along the Z axis) of the linear acceleration undergone by the portion 30 of inner surface 33 of the tyre.

The system for monitoring 100 comprises a processing unit 80 in communication, for example through the (for example wireless) communication line A, with the accelerometric sensor 70 to receive an accelerometric signal representative of the three components of the detected linear acceleration.

The present invention contemplates any arrangement and logical and/or physical partition of the processing unit, which can for example be a single physical and/or logical unit or composed of several distinct and cooperating physical and/or logical units, such units being possibly placed, in whole or in part, in the accelerometric sensor, in the tyre, in the rim, on board the vehicle (not shown) on which the tyre 99 is fitted, and/or in a remote station in connection with the vehicle on which the tyre 99 is fitted.

Exemplarily the processing unit 80 is connected, exemplarily by communication line R (with or without wires), to a display device 73, for example the screen of the on-board computer of the vehicle, for transmitting the result of the monitoring of the status of the tyre.

Exemplarily the system for monitoring 100 also comprises a pressure sensor 71, exemplarily housed in the valve or on the inner surface of the tyre 99 (for example next to the sensor 70), and structured to detect a pressure of the tyre 99 (i.e., the inflation pressure of the tyre into the inner cavity of the tyre). The pressure sensor 71 is in communication, exemplarily through the (for example wireless) communication line P, with the processing unit 80 for transmitting the measured pressure value.

Exemplarily the system for monitoring 100 comprises a speed sensor 72, exemplarily mounted on the vehicle, and structured to detect a forward speed of the vehicle (and consequently of the tyre 99). The speed sensor 72 is in communication, exemplarily through the communication line V (with or without wires), with the processing unit 80 for transmitting the measured forward speed value.

Exemplarily the system for monitoring 100 further comprises an acceleration sensor 74, exemplarily mounted onto the vehicle (e.g., forming part of the inertial platform of the vehicle), and structured to detect a longitudinal and/or lateral acceleration of the vehicle (and consequently of the tyre 99). The acceleration sensor 74 is in communication, exemplarily through the communication line E (with or without wires), with the processing unit 80 for transmitting the measured longitudinal and/or lateral acceleration value.

Exemplarily the processing unit 80 is programmed and configured to carry out the operations described below.

Figure 2:
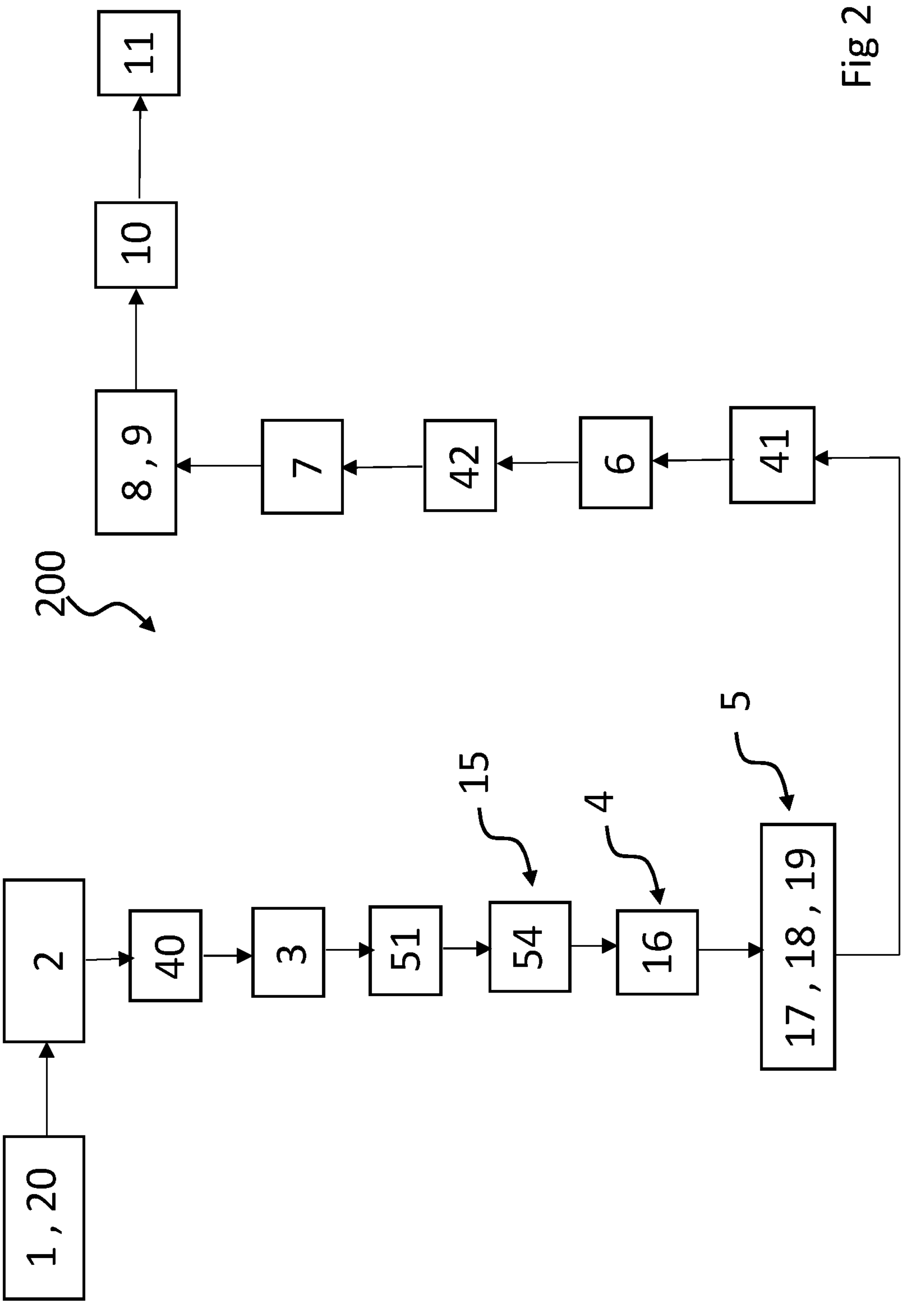
FIG. 2 shows a flow diagram of a method for monitoring the status of a tyre according to one embodiment of the present invention.

FIG. 2 shows a flow diagram of the operations of an example of a method for monitoring 200 a status of a tyre 99 according to the present invention, which can be implemented with the system for monitoring 100 described above.

Preferably the tyre 99 is fitted 1 on the vehicle and is inflated 20 to a desired pressure, exemplarily equal to the operating pressure of the tyre, for example equal to 200 kPa.

Exemplarily the method 200 comprises determining 2 (for example entering in the processing unit at the time of the fitting of the tyre) a reference modal mass of the tyre. In general, the reference modal mass is a parameter that depends on the chosen tyre type, and typically has a value equal to about 75% of the total mass of the tyre 99 for standard tyres, a value equal to about 70% of the total mass of the tyre for tyres having the bead area thicker than the tread area and a value equal to about 80% of the total mass of the tyre for tyres having the bead area thinner than the tread area.

Subsequently, in a first operative phase which exemplarily starts when the vehicle has travelled about 500 km from the condition of new tyre, with the tyre 99 in a reference status (in the example the status of relaxed tyre, i.e., that has released the internal stresses due to the production process, e.g., to the vulcanization, but still in a status of perfect structural integrity and of not worn tread) the method 200 comprises the following operations.

Exemplarily it is provided detecting 40 a value of the pressure of the tyre 99 in the first operative phase, and acquiring 3 an accelerometric signal representative of only the axial component of the linear acceleration undergone by the portion 30 of inner surface 33 at the detected pressure value. Exemplarily acquiring 3 the accelerometric signal is carried out provided that a longitudinal and/or lateral acceleration of the vehicle is less than or equal to 0.5 $m/s^2$. Exemplarily acquiring 3 the accelerometric signal is carried out provided that a forward speed of the vehicle is between 20 km/h and 70 km/h (extremes included).

Exemplarily the accelerometric signal temporally corresponds to 500 turns of the tyre 99.

Exemplarily it is provided categorizing 51 the forward speed of the vehicle in a plurality of speed sub-intervals, for example five sub-speed intervals disjoint from each other. In the example, the five sub-intervals respectively go: from 20 km/h to 30 km/h, from 30 km/h to 40 km/h, from 40 km/h to 50 km/h, from 50 km/h to 60 km/h and from 60 km/h to 70 km/h.

Exemplarily the accelerometric signal comprises a plurality of accelerometric signal portions corresponding to a respective plurality of continuous time intervals, each of which is exemplarily temporally spaced apart from the subsequent time interval.

Exemplarily the accelerometric signal comprises five groups of accelerometric signal portions, wherein the signal portions of each group are acquired provided that the forward speed of the vehicle is included in a respective speed sub-interval.

Exemplarily the groups are substantially homogeneous with each other in terms of turns of the tyre 99 to which each group globally corresponds, and therefore each group globally corresponds to about 100 turns of the tyre 99.

The number of signal portions belonging to each group can vary according to the actual conditions in which the tyre 99 is, and, in the present example, it goes from a minimum of only one portion (if all the required turns are acquired in a single acquisition) up to a maximum of one hundred signal portions.

Exemplarily each group averagely comprises about ten signal portions (taken at different time instants) and each signal portion temporally corresponds to averagely ten turns of the tyre 99. Exemplarily once the accelerometric signal has been acquired, it is provided filtering 15 from the accelerometric signal a part of the accelerometric signal temporally corresponding to each passage of the crown portion 31 in the footprint area of the tyre 99.

Figure 4:
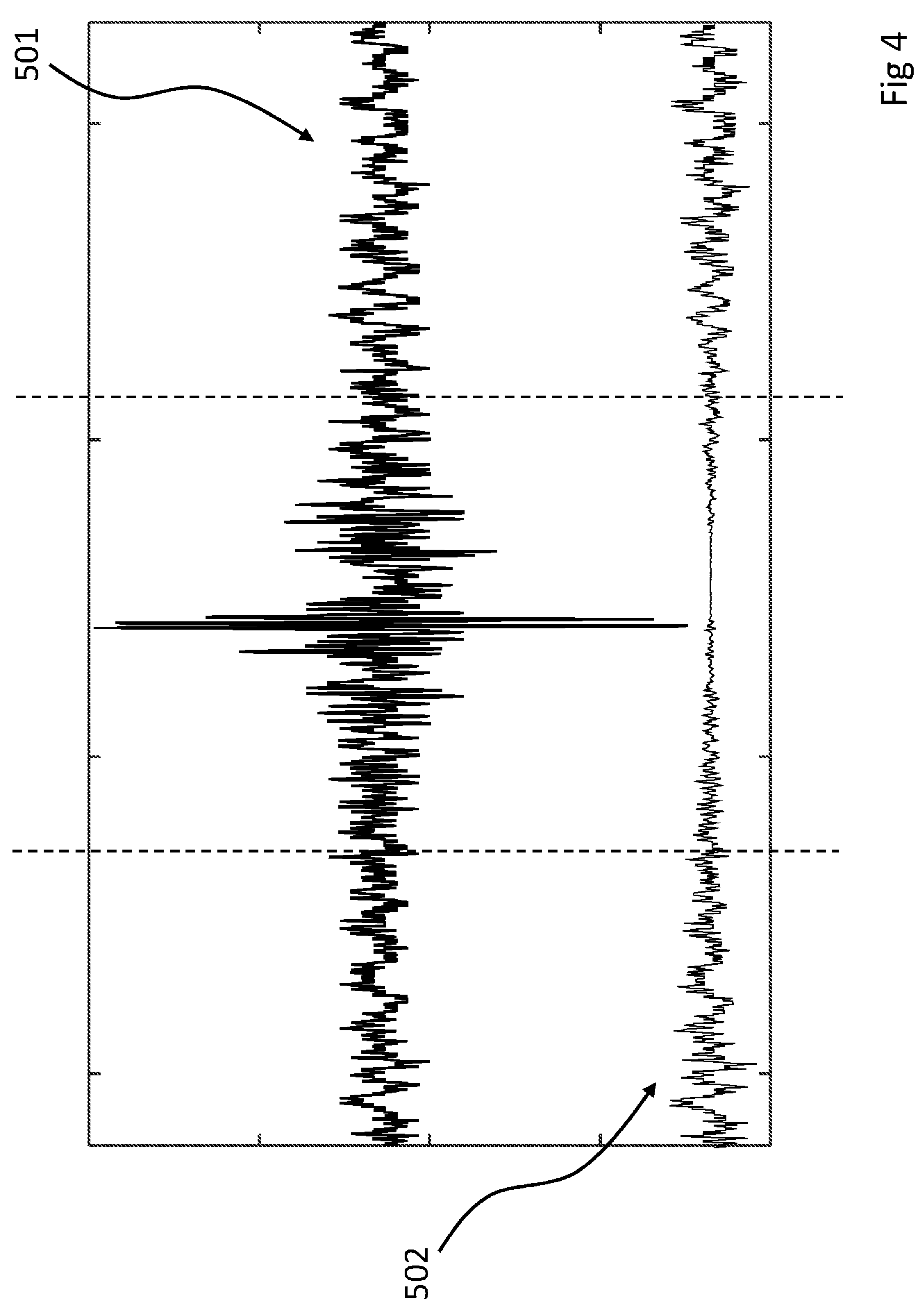
FIG. 4 schematically shows an example of filtering operation carried out on a motion signal.

Exemplarily filtering 15 the part of signal comprises, for each complete turn of the tyre, multiplying 54 said motion signal by a window function, exemplarily a Hanning window, which exemplarily assumes the minimum value when the relevant crown portion 31 is at the centre of the footprint area and assumes the maximum value (typically equal to one) when the relevant crown portion 31 is at 180° from the centre of the footprint area. FIG. 4 exemplarily shows the raw accelerometric signal 501 corresponding to a complete turn of the tyre, and the corresponding signal 502 after the multiplication by the Hanning window. In the figure it is possible to see how the absolute value of the signal is greatly reduced by the aforesaid multiplication operation, when the crown portion 31 is within the footprint area (schematically delimited by the dotted lines). Alternatively, the aforesaid part of the accelerometric signal (for example corresponding to 180° of rotation) can exemplarily be eliminated.

After the filtering 15, through frequency analysis, it is provided obtaining 4 a frequency spectrum of the filtered accelerometric signal, the frequency spectrum exemplarily comprising a plurality of peaks. For example, the frequency spectrum is obtained calculating a fast Fourier transform (FFT) 16 or by carrying out a PSD (Power Spectral Density) operation on the filtered accelerometric signal.

Exemplarily it is provided identifying 5 a determined peak of the plurality of peaks and determining a frequency of the determined peak (i.e., the frequency at which the determined peak occurs).

Exemplarily identifying 5 the determined peak in the frequency spectrum comprises:

- identifying 17 each peak of the plurality of peaks, for example by identifying the inflection points with a positive second derivative within the frequency spectrum (or by identifying the points having a null first derivative and a positive second derivative within the frequency spectrum);
- ordering 18 the peaks by assigning a sequential (for example increasing) order n with an increasing value of the frequency at which each peak occurs;
- selecting 19 a peak of order one, which, for example, lies within the frequency range 30-80 Hz.

Figure 3:
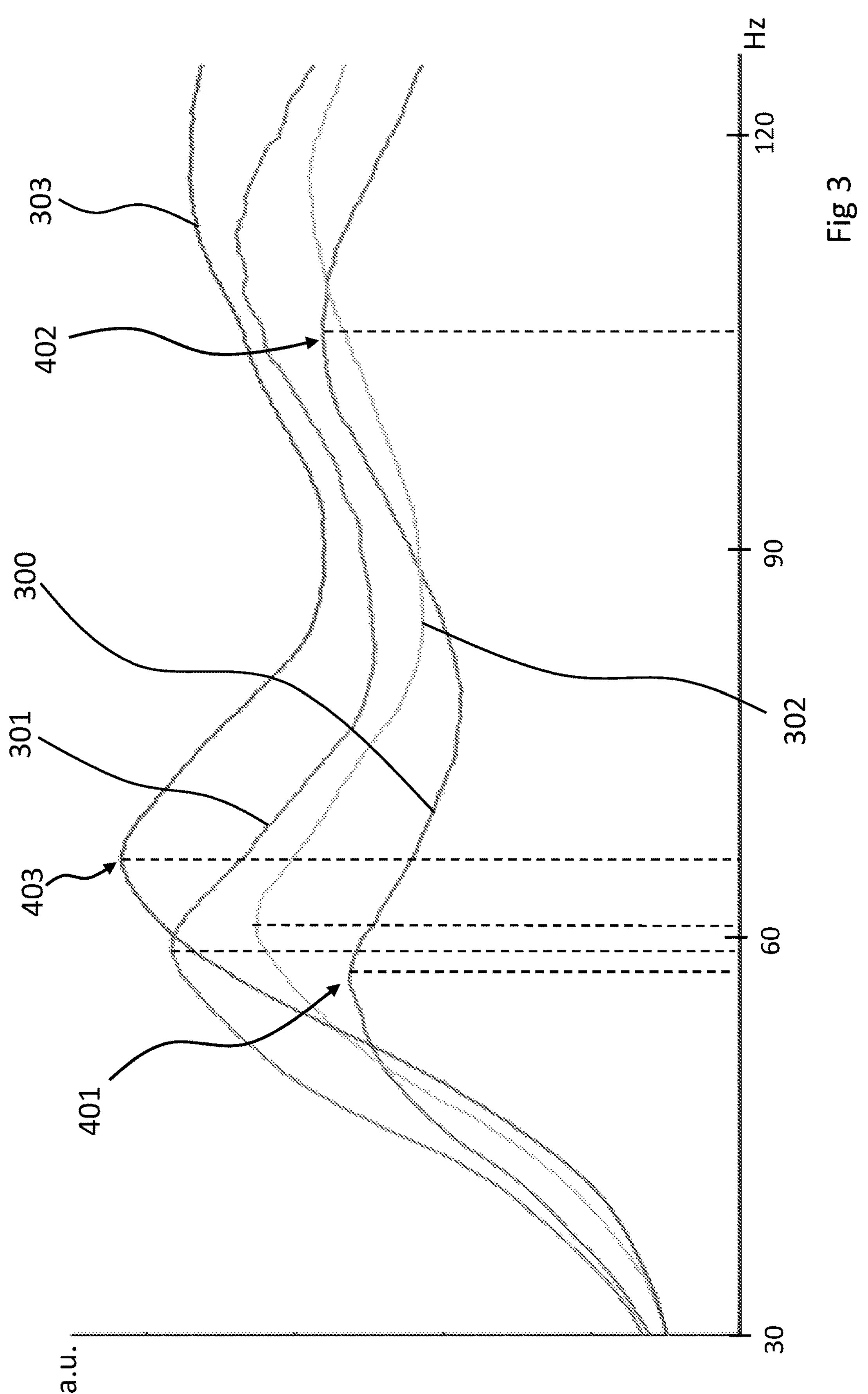
FIG. 3 schematically shows an example of a frequency spectrum obtained respectively for four different wear values of the tread band of a tyre applying the method of the present invention.

For example, in FIG. 3 the curve 300 represents a portion comprised between 30 and 120 Hz (considered the portion of spectrum with higher information content for the present example) of a frequency spectrum obtained for a not worn tyre, in which the peaks of order one (indicated with the number 401) and of order two (indicated by the number 402), and the respective frequencies, are at least partially visible.

Exemplarily the processing unit 80 is configured for storing the frequency of the determined peak determined in the first operative phase of the vehicle.

Subsequently, exemplarily in a second operative phase which for example begins after travelling 1000 km, the method 200 comprises iteratively carrying out the following operations (for example after travelling every 50 km):

i) detecting 41 a current value of the pressure of the tyre 99 in the second operative phase;

ii) acquiring 6 an accelerometric signal representative of the lateral component of the acceleration undergone by the portion 30 of the inner surface 33 at the current value of the pressure in the second operative phase. The acquisition of the accelerometric signal in the second operative phase respects the same conditions as the acquisition of the accelerometric signal in the first operative phase, and the accelerometric signal in the second operative phase is built as explained above, i.e., it temporally corresponds to a same number of turns (exemplarily 500) and is made of a same number of groups (exemplarily five) of signal portions, each group comprising a same number of turns (exemplarily equal to one hundred);

iii) filtering 42 the part of the accelerometric signal comprising the footprint area as exemplarily explained above;

iv) obtaining 7 a frequency spectrum of the filtered accelerometric signal in the second operative phase, this frequency spectrum exemplarily comprising a respective plurality of peaks. For example, even the frequency spectrum obtained in the second operative phase is obtained by carrying out a fast Fourier transform (FFT) or a PSD operation on the filtered accelerometric signal;

v) identifying 8 a determined peak in the plurality of peaks of the frequency spectrum obtained in the second operative phase, which corresponds to the determined peak in the plurality of peaks of the frequency spectrum obtained in the first operative phase. In the example, the determined peak identified in the second operative phase is also the peak of order one in the frequency spectrum obtained in the second operative phase, and it is within the frequency range 30-80 Hz;

vi) determining 9 a frequency of the determined peak identified in the frequency spectrum obtained in the second operative phase.

With reference to FIG. 3, curves 301, 302 and 303 represent a portion comprised between 30 and 120 Hz of three different exemplary frequency spectra obtained in the second operative phase for three different wear values of the tyre 99 (respectively 2 mm, 4 mm and 6 mm of wear). For each of these curves, the peaks of order one (within the frequency range 30-80 Hz) and (at least partially) of order two (above 80 Hz), and the respective frequencies, are visible.

Exemplarily it is provided, for example after having detected the current value of the pressure in the second operative phase, determining 10 a reference frequency as a function of the frequency of the determined peak of the frequency spectrum obtained in the first operative phase, and of the values of the pressure detected in the first and the second operative phase, exemplarily by the following mathematical formula:

$$f(p) = \sqrt[2]{f_0^2\left(1 + \alpha_p \frac{p - p_0}{p_0}\right)}$$

wherein f(p) is the reference frequency; $f_0$ is the frequency of the determined peak of the frequency spectrum obtained in the first operative phase, p and $p_0$ are the pressure values respectively detected in the second and the first operative phase and $\alpha_p$ isa predetermined mathematical constant, for example equal to 0.74.

Subsequently, the method 200 comprises determining 11 the status of the tyre 99 based on a comparison between the reference frequency (or in one alternative embodiment the first frequency) and the frequency of the determined peak of the frequency spectrum obtained in the second operative phase, for exemplarily determining a status of loss of integrity and/or a status of wear of the tyre 99.

Exemplarily the status of wear of the tyre 99 is determined provided that the frequency of determined peak increases, i.e., the frequency of the determined peak obtained in the second operative phase is greater than the reference frequency.

Exemplarily the status of loss of integrity of the tyre is determined provided that the frequency of determined peak decreases, i.e., the frequency of the determined peak obtained in the second operative phase is less than the reference frequency.

It is also exemplarily possible calculating a modal mass percentual reduction (correlated to the wear phenomenon) for example by the following formula:

$$\Delta m\ \% = \frac{f_0^2}{f^2} * 100$$

wherein Δm % is the modal mass percentual reduction, $f_0$ is the reference frequency, and f is the frequency of the determined peak obtained in the second operative phase. Alternatively, it is also possible to calculate a current modal mass of the tyre 99, i.e., the residual modal mass of the tyre due to the wear phenomenon, exemplarily by the formula:

$$m = m_0 * \left(\frac{f_0^2}{f^2}\right)$$

wherein m is the current modal mass and $m_0$ is the reference modal mass (e.g., acquired at the fitting of the tyre on the vehicle).

From the current modal mass m or from the value of modal mass reduction Δm % it is then possible deriving the tread thickness lost due to wear, as a function of physical and geometric parameters of the tyre, for example the density of the compound, the initial width and the initial thickness of the tread band.

The invention claimed is:

1. A method for monitoring a status of a tyre fitted on a vehicle, the method comprising:

with the vehicle in motion and the tyre in rotation, acquiring a motion signal representative of a motion of a crown portion of the tyre, wherein the motion signal temporally corresponds to a plurality of turns of the tyre;

filtering from the motion signal a part of the motion signal temporally corresponding at least to each passage of the crown portion in a footprint area of the tyre, for obtaining a filtered motion signal;

obtaining a frequency spectrum of the filtered motion signal; and determining the status of the tyre based on the frequency spectrum wherein the frequency spectrum comprises a plurality of peaks, and wherein the method further comprises identifying a determined peak from the plurality of peaks and determining a frequency of the determined peak, wherein determining the status of the tyre is carried out based on a time trend of the frequency of the determined peak, and wherein determining the status of the tyre comprises:

determining a status of loss of structural integrity of the tyre on condition that the frequency of the determined peak temporally decreases, and determining a status of wear of a tread of the tyre on condition that the frequency of the determined peak temporally increases.

2. The method according to claim 1, wherein filtering the part of the motion signal comprises multiplying the motion signal by a window function, wherein the window function has a bell shape centred in a centre of the footprint area.

3. The method according to claim 1, wherein the plurality of turns of the tyre comprises a total number of the turns greater than or equal to 300, or less than or equal to 2000, or greater than or equal to 300 and less than or equal to 2000, and wherein acquiring the motion signal is carried out when one or more of the following conditions occur:

a lateral acceleration of the vehicle is less than or equal to 2 $m/s^2$;

a longitudinal acceleration of the vehicle is less than or equal to 2 $m/s^2$; and a forward speed of the vehicle is greater than or equal to 20 km/h and/or less than or equal to 80 km/h.

4. The method according to claim 1, wherein the motion signal comprises a plurality of motion signal portions respectively temporally corresponding to a plurality of continuous time intervals, wherein each continuous time interval is temporally separated from the temporally subsequent continuous time interval, and wherein each motion signal portion temporally corresponds to a plurality of turns of the tyre.

5. The method according to claim 4, further comprising categorizing a forward speed of the vehicle into a plurality of speed sub-intervals disjointed from each other, and wherein each speed sub-interval has a width greater than or equal to 4 km/h, or less than or equal to 20 km/h, or greater than or equal to 4 km/h and less than or equal to 20 km/h, wherein the motion signal comprises a plurality of groups of the motion signal portions, wherein the motion signal portions of each group are acquired on condition that the forward speed of the vehicle is included in a respective speed sub-interval, and wherein the groups of signal portions are substantially homogeneous to each other in terms of tyre turns to which each group globally corresponds.

6. The method according to claim 1, wherein the motion signal is an accelerometric signal representative of at least one component of a linear acceleration undergone by the crown portion of the tyre, and wherein the at least one component of the acceleration is chosen from the group: axial component, radial component and tangential component.

7. The method according to claim 1, wherein determining the status of the tyre comprises determining a status of wear of the tyre by:

determining a reference modal mass of the tyre in a reference status, wherein the reference modal mass is greater than or equal to 60% of a total mass of the tyre, or less than or equal to 85% of a total mass of the tyre when new, or greater than or equal to 60% and less than or equal to 85% of a total mass of the tyre;

determining a reference modal stiffness of the tyre in the reference status as a function of the reference modal mass of the tyre and of the frequency of the determined peak determined with the tyre in the reference status; and determining a thickness of a tread of the tyre as a function of the reference modal mass, the reference modal stiffness, the frequency of the determined peak, and as a function of physical and geometric parameters of the tyre, wherein the reference status is a status of undamaged and not worn tyre, and wherein the method further comprises determining the reference status when the vehicle has travelled a distance greater than or equal to 300 km and less than or equal to 1000 km since when the tyre in a new status is fitted.

8. The method according to claim 1, wherein acquiring the motion signal, filtering the part of the motion signal, obtaining the frequency spectrum, and determining the status of the tyre based on the frequency spectrum are carried out in a first operative phase of the vehicle with the tyre in a reference status and in a second operative phase of the vehicle subsequent to the first operative phase.

9. The method according to claim 1, wherein the frequency of the determined peak is a modal frequency of a vibration mode of the tyre chosen from a group of first vibration modes: lateral translational, vertical translational, horizontal translational, torsional around the rotation axis of the tyre (Y), torsional around the vertical axis (Z), and torsional around the horizontal axis (X).

10. The method according to claim 1, wherein identifying the determined peak comprises:

in the frequency spectrum, ordering the peaks of the plurality of peaks, and assigning a sequential order n to an increasing value of the frequency of each peak in the frequency spectrum;

in the frequency spectrum, identifying a peak of order n, wherein the peak of order n is the determined peak, or in the frequency spectrum, identifying a peak in a predetermined frequency range from 20 Hz up to 100 Hz.

11. A system for monitoring a status of a tyre fitted on a vehicle, the system comprising:

a motion sensor fixed at a crown portion of the tyre and which detects a motion of the crown portion of the tyre;

at least one processing unit in communication with the motion sensor and programmed to:

with the vehicle in motion and the tyre in rotation, acquire a motion signal representative of a motion of a crown portion of the tyre, wherein the motion signal temporally corresponds to a plurality of turns of the tyre;

filter from the motion signal a part of the motion signal temporally corresponding at least to each passage of the crown portion in a footprint area of the tyre, for obtaining a filtered motion signal;

obtain a frequency spectrum of the filtered motion signal; and determine the status of the tyre based on the frequency spectrum wherein the motion sensor comprises an accelerometric sensor structured for detecting a component of a linear acceleration undergone by the crown portion of the tyre, wherein the motion sensor is fixed at a portion of inner surface of the tyre belonging to the crown portion of the tyre, wherein the system for monitoring the status of the tyre comprises:

a speed sensor mounted onto the vehicle for detecting a forward speed of the vehicle, wherein the speed sensor is connected to the at least one processing unit; and an acceleration sensor mounted onto the vehicle for detecting a longitudinal acceleration of the vehicle, or a lateral acceleration of the vehicle, or a longitudinal acceleration of the vehicle and a lateral acceleration of the vehicle, wherein the acceleration sensor is connected to the at least one processing unit, wherein the at least one processing unit is programmed for carrying out a method for monitoring a status of a tyre fitted on a vehicle.

12. A method for monitoring a status of a tyre fitted on a vehicle, the method comprising:

with the vehicle in motion and the tyre in rotation, acquiring a motion signal representative of a motion of a crown portion of the tyre, wherein the motion signal temporally corresponds to a plurality of turns of the tyre;

filtering from the motion signal a part of the motion signal temporally corresponding at least to each passage of the crown portion in a footprint area of the tyre, for obtaining a filtered motion signal;

obtaining a frequency spectrum of the filtered motion signal; and determining the status of the tyre based on the frequency spectrum wherein determining the status of the tyre comprises determining a status of wear of the tyre by:

determining a reference modal mass of the tyre in a reference status, wherein the reference modal mass is greater than or equal to 60% of a total mass of the tyre, or less than or equal to 85% of a total mass of the tyre when new, or greater than or equal to 60% and less than or equal to 85% of a total mass of the tyre;

determining a reference modal stiffness of the tyre in the reference status as a function of the reference modal mass of the tyre and of the frequency of the determined peak determined with the tyre in the reference status; and determining a thickness of a tread of the tyre as a function of the reference modal mass, the reference modal stiffness, the frequency of the determined peak, and as a function of physical and geometric parameters of the tyre, wherein the reference status is a status of undamaged and not worn tyre, and wherein the method further comprises determining the reference status when the vehicle has travelled a distance greater than or equal to 300 km and less than or equal to 1000 km since when the tyre in a new status is fitted.

* * * * *